United States Patent

Niwa et al.

Patent Number: 5,804,324
Date of Patent: Sep. 8, 1998

[54] SETTING MEMBER FOR HEATING MATERIAL

[75] Inventors: Shigeki Niwa, Osada; Hiroshi Okada, Nishio; Yasuharu Okiyama, Anjo; Toshiyuki Suzuki, Hekinan, all of Japan

[73] Assignee: Toshiba Ceramics Co., Ltd., Tokyo, Japan

[21] Appl. No.: 588,512

[22] Filed: Jan. 18, 1996

[30] Foreign Application Priority Data

Jan. 18, 1995 [JP] Japan .................................. 7-005931
Dec. 13, 1995 [JP] Japan .................................. 7-324404

[51] Int. Cl.$^6$ .................................................. B32B 17/00
[52] U.S. Cl. ........................... 428/701; 428/325; 428/702
[58] Field of Search .................... 428/688, 701, 428/702, 325, 328

[56] References Cited

FOREIGN PATENT DOCUMENTS

| | | |
|---|---|---|
| 57-91099 | 6/1982 | Japan . |
| 59-22147 | 5/1984 | Japan . |
| 60-51426 | 11/1985 | Japan . |
| 63-25487 | 2/1988 | Japan . |
| 63-33551 | 2/1988 | Japan . |
| 64-89510 | 4/1989 | Japan . |
| 1-24745 | 5/1989 | Japan . |
| 3-177379 | 8/1991 | Japan . |
| 3-223193 | 10/1991 | Japan . |
| 3-77652 | 12/1991 | Japan . |
| 4-586 | 1/1992 | Japan . |
| 4-21330 | 4/1992 | Japan . |
| 4-224172 | 8/1992 | Japan . |
| 5-47505 | 7/1993 | Japan . |
| 5-178673 | 7/1993 | Japan . |
| 7-10743 | 2/1995 | Japan . |

Primary Examiner—Timothy M. Speer
Attorney, Agent, or Firm—Foley & Lardner

[57] ABSTRACT

A setting member for a heating material formed by sintering and heating a base and a coating layer at 1300° to 1550° C., in which the base comprises at least one selected from the group consisting of $Al_2O_3$, $MgO$ and $ZrO_2$ in an amount of 70 wt % or more, the coating layer contains at least one main component selected from the group consisting of $Al_2O_3$, $MgO$ and $ZrO_2$ in an amount of 80 wt % or more and 0.5 to 10.0 wt % of at least one additional component selected from $Fe_2O_3$, $TiO_2$, $BaO$, $SrO$, $ZrO_2$, $CaO$, and $MgO$ (different from CaO and MgO used as a stabilizer for $ZrO_2$) excluding the same types of the additional component as used in the main component of the coating layer.

13 Claims, 2 Drawing Sheets

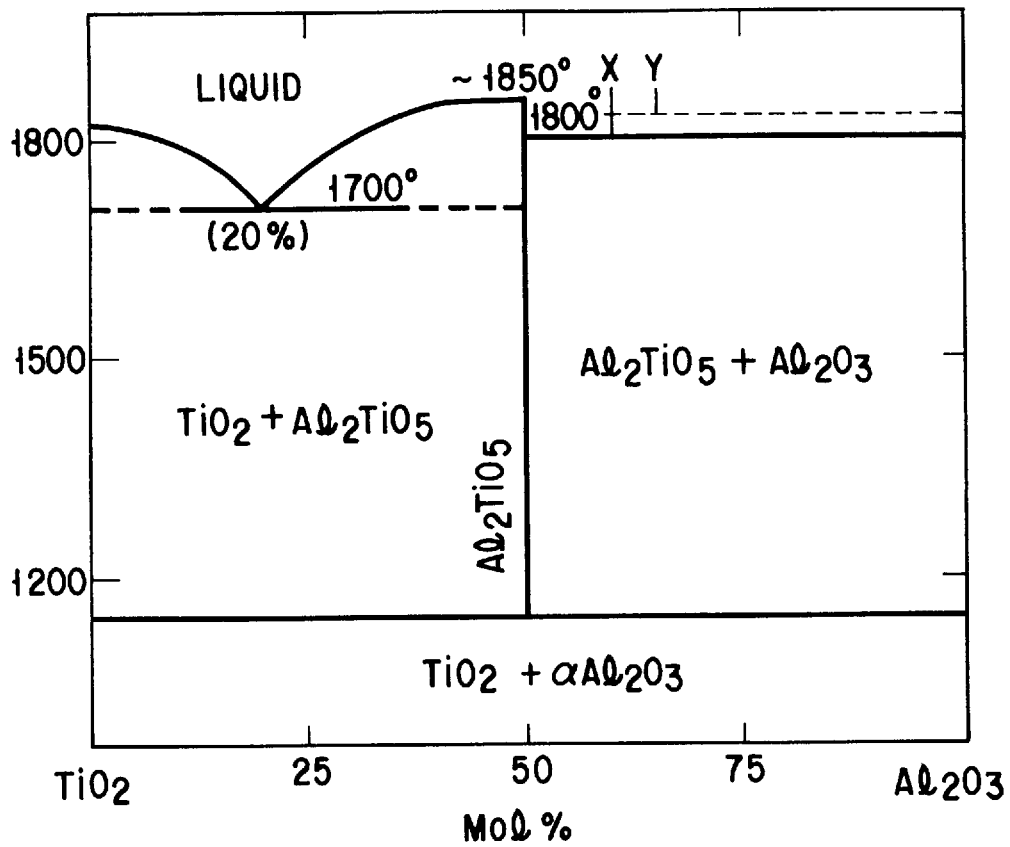
F I G. 1

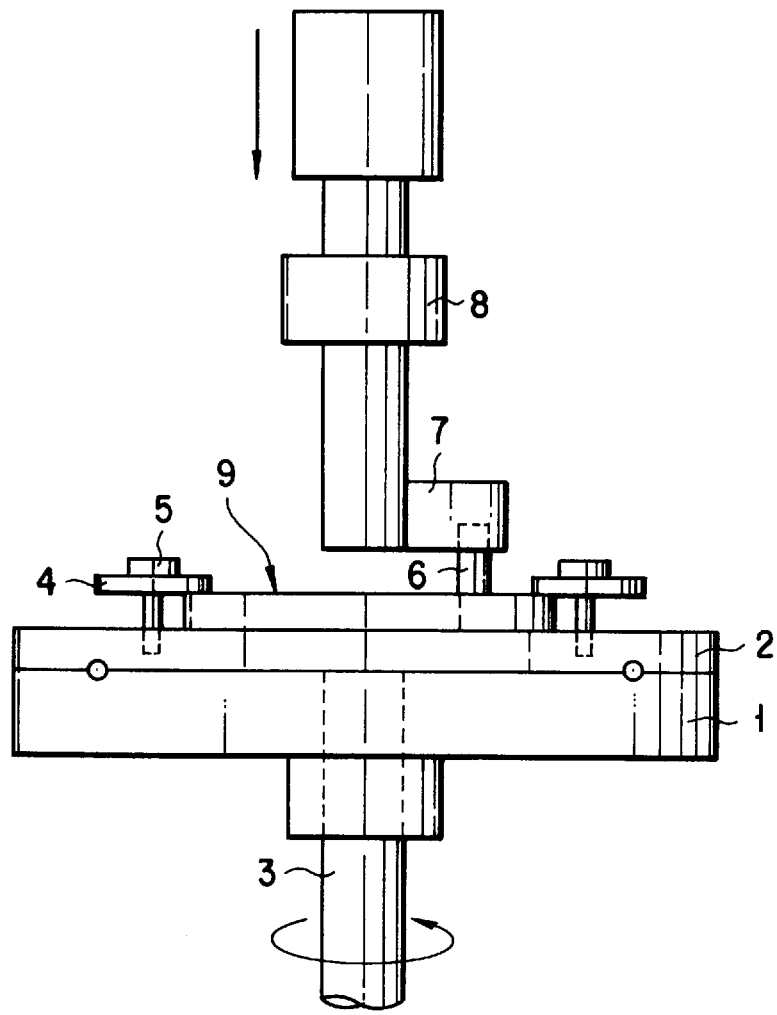
F I G. 2

SETTING MEMBER FOR HEATING MATERIAL

BACKGROUND OF THE INVENTION

1. Field of the Invention

The present invention relates to a setting member for use in heating or sintering (hereinafter, referred to as "heating") ferrite and functional ceramics such as a ceramic condenser. More particularly, the present invention relates to a setting member comprising a base refractory and a hard coating layer firmly coated on the base refractory partially or in its entirety and which is hardly peeled off or abraded even if the setting member is repeatedly heated and cooled.

2. Description of the Related Art

Hitherto, a setting member, such as a rack or a vessel, has been widely used in heating ferrite and electric parts made of functional ceramics such as ceramic condenser. The setting member comprises a base refractory (hereinafter referred to as "base") formed of $Al_2O_3$ and a $ZrO_2$ coating layer.

Since $ZrO_2$ has a high density, a setting member formed of $ZrO_2$ alone is very heavy. Then, if a light-weight setting member is desired most, it will be better to use $ZrO_2$ only in a coating layer. Furthermore, since $ZrO_2$ is less reactive to a relatively wide variety of heating materials, it is suitable for use in a coating layer. On the other hand, the $Al_2O_3$ base material, if used together with $SiO_2$, exhibits excellent properties, easy to sinter and hard to break, as is known in prior art. However, $SiO_2$ is not preferable for a heating material. Direct contact of $SiO_2$ with a heating material must be avoided.

For these reasons, a setting member comprising the $Al_2O_3$ base material and $ZrO_2$ coating layer, which may be formed on the surface of the base by various methods, has been conventionally and widely used. If the coating layer is made of $ZrO_2$ alone by heating, the resultant layer will be easily peeled off from a base since $ZrO_2$ is converted from a monocrystal form to a tetracrystal form at about 1100° C. Therefore, in most cases, $ZrO_2$ is used after partially stabilized with CaO or $Y_2O_3$ into a tetracrystal form.

However, there is a problem in the setting member formed of an $Al_2O_3$ base and a $ZrO_2$ coating layer formed on the surface of the base partially or in its entirety by the aforementioned method. That is, after the setting member is used many times, the $ZrO_2$ coating layer is peeled off or abraded. As a result, the removed $ZrO_2$ particles bond on a heated material. Hence, it has been strongly desirable to further improve the resistance of the coating layer.

The $ZrO_2$ layer may be mechanically peeled off or abraded due to the difference in thermal expansibility between the base and the $ZrO_2$ coating layer and due to the reaction taken place between $ZrO_2$ and components contained in a functional ceramic when the functional ceramic is placed on the setting member and heated. Various proposals have been previously proposed to prevent the removal or abrasion of the $ZrO_2$ layer, but all of them are unsatisfactory. The conventionally known proposals for preventing the mechanical removal or abrasion of the $ZrO_2$ layer are classified into the following four methods:

A first method is a press molding method as proposed in Jpn. Pat. Appln. KOKOKU Publication No. 60-51426. In this method, a $ZrO_2$ layer having 10 to 50 wt % weight relative to the total weight of the bottom thickness, is placed on the bottom of a container made of $Al_2O_3$—$SiO_2$. Then, the $Al_2O_3$—$SiO_2$ base and $ZrO_2$ layer are pressed and molded to form an integral structure. In this manner, the $Al_2O_3$—$SiO_2$ base is coated with the $ZrO_2$ coating layer.

This method is advantageous in forming a $ZrO_2$ layer thick enough to prevent the peeling of the $ZrO_2$ layer, but it hardly applies the $ZrO_2$ coating layer to the entire base surface. If the entire base surface is coated with the $ZrO_2$, the resultant setting member will be too heavy to handle.

In a second method, various improvements are provided to the $ZrO_2$ layer itself. For example, in Jpn. Pat. Appln. KOKAI Publication No. 3-223193, an intermediate layer formed of $ZrO_2$ partially stabilized with $Y_2O_3$ is interposed in the middle of the $ZrO_2$ coating layer, to improve the peel resistance of the $ZrO_2$ coating layer. In Jpn. Pat. Appln. KOKAI Publication No. 3-177379, a desired number of $Al_2O_3/ZrO_2$ coating layers are provided on the surface of an alumina base. The $Al_2O_3/ZrO_2$ coating layers are designed to have a molar ratio of $Al_2O_3$ to $ZrO_2$ which is gradually decreased from the base side toward the outer side. Jpn. Pat. Appln. KOKAI Publication No. 4-224172 discloses an zirconia diffusion layer which is interposed between an $Al_2O_3$ base and a zirconia coating layer.

However, in Publication Nos. 3-223193 and 3-177379, the peel resistance of the $ZrO_2$ layer is not satisfactory since the $ZrO_2$ layer is mechanically bonded but not chemically.

Furthermore, in Publication No. 4-224172, the solid-solution of $ZrO_2$ is slightly present in the $Al_2O_3$ base, however, a reaction product between $ZrO_2$ and $Al_2O_3$ is not yielded. Therefore, $ZrO_2$ and $Al_2O_3$ are substantially bonded in a mechanical manner, so that the bonding strength is unsatisfactory.

A third method is one in which $ZrO_2$ particles are bonded on the surface of a base by use of an adhesive agent after molding or sintering. For example, in Jpn. Pat. Appln. KOKAI Publication No. 63-25487, a zirconia powder is bonded on a base via an alumina slurry and the resultant structure is heated to coat the $ZrO_2$ layer on the base. Jpn. Pat. Appln. KOKAI Publication No. 64-89510 disclose a $ZrO_2$ layer formed by bonding $ZrO_2$ particles with an inorganic glass binder. Furthermore, Jpn. UM. Appln. Publication No. 57-91099 discloses a $ZrO_2$ layer formed of a zirconia powder by bonding the zirconia powder on the surface of a base via a vitrification substance acting at a low melting point.

However, the third methods are unfavorable since zirconia particles fall off. More particularly, this method is unfavorable since Si is the main component of an inorganic glass binder.

A fourth method is a flame-spray method. In this method, $ZrO_2$ is flame-sprayed into the sintered base to simultaneously bond $ZrO_2$ on the base. In Jpn. Pat. Appln. KOKOKU Publication No. 4-586, partially stabilized zirconia is repeatedly flame-sprayed on a base while the content of CaO is gradually increased. In Jpn. Pat. Appln. KOKOKU Publication No. 3-77652, the thermal expansibility of a base becomes nearly equal to that of a coating material through flame-spray of partially stabilized zirconia.

The coating layer obtained by the flame-spray method is dense enough to prevent a reaction with a heating material. However, the flame-spray method is not satisfactory to prevent peeling of the $ZrO_2$ layer since the flame-spray is not basically a chemical reaction.

The flame-spray method converts the a component of a base and a coating layer in quality. As a result, a heating material may react with the converted base component or coating component. Moreover, depending on the type of the heating material, the setting member obtained by use of the flame-spray cannot be used. Furthermore, the flame spray method has a problem in that it requires a specific apparatus and material.

Another technique of the flame-spray method using zirconia is disclosed in Jpn. Pat. Appln. KOKOKU Publication No. 4-21330. In this method, an $Al_2O_3$ flame-spray layer is formed between a base and zirconia coating layer. However, due to a multi-layered structure, this method raises cost. As is mentioned above, there are various proposals in the prior art but any one of the proposals is unsatisfactory.

More specifically, $ZrO_2$ is low in reactivity and hardly sintered to bond to a base, unlike alumina and mullite refractory materials. To obtain a sufficiently strong structure, the $ZrO_2$ layer must be heated at relatively high temperature, e.g., 1600° C. or more. To bond a $ZrO_2$ layer to the base, the higher temperature the $ZrO_2$ layer is heated at, the larger distortion between the base and the $ZrO_2$ coating layer is generated, ascribed to the different thermal expansion therebetween. As a result, problems such as peeling and cracks are likely to occur after the heating.

To prevent the peeling and cracks, if $ZrO_2$ is heated at low temperature, sufficient strength of the $ZrO_2$ layer will not be obtained. As a result, peeling and particle removal also take place due to friction.

As prior art other than a zirconia-coated setting member, a ferrite-core heating case is disclosed in Jpn. Pat. Appln. KOKOKU publication No. 5-47505, and a heating setter is disclosed in Jpn. Pat. Appln. KOKOKU publication No. 1-24745. The ferrite-core heating case is made of ferrite, mullite and zirconia. Owing to the addition of ferrite, the low reactivity is overcome but a heating material is inevitably exposed to mullite. In this respect, this method is unsatisfactory.

The heating setter is formed by heating a mixture of a spinelle-structure ferrite and a non-spinelle structure ferrite. Since the heating setter has a porosity of 15 to 40%, it is not suitable for use in the coating layer. In addition, the strength of the heating setter is low, so that peeling is liable to occur and the abrasion resistance is low.

SUMMARY OF THE INVENTION

The purpose of the invention is to provide a setting member for a heating material, which comprises a base and a coating layer having excellent hardness, bonded on the surface of a base, partially or in its entirety. According to the present invention, there is provided a setting member for a heating material having a coating layer which is hardly abraded and peeled off even if it is repeatedly exposed to high temperatures.

In one aspect of the present invention, there is provided a setting member for a heating material comprising a base and a coating layer formed on a surface of the base partially or in its entirety, in which the base comprises at least one main component selected from the group consisting of $Al_2O_3$, MgO and $ZrO_2$ in an amount of 70 wt % or more and the coating layer comprises at least one main component selected from the group consisting of $Al_2O_3$, MgO and $ZrO_2$ in an amount of 80 wt % or more and 0.5 to 10.0 wt % of at least one additional component selected from $Fe_2O_3$, $TiO_2$, BaO, SrO, CaO, and MgO (different from CaO and MgO used as a stabilizer for $ZrO_2$) excluding the same type of the additional component as used in the main component of the coating layer.

To be more specific, the main component of the base may comprise at least one selected from the group consisting of $ZrO_2$ partially stabilized with CaO, $ZrO_2$ partially stabilized with MgO, and $ZrO_2$ partially stabilized with $Y_2O_3$.

A main component of the base may comprise unstabilized $ZrO_2$ and at least one selected from the group consisting of $ZrO_2$ partially stabilized with CaO, $ZrO_2$ partially stabilized with MgO, and $ZrO_2$ partially stabilized with $Y_2O_3$.

The base may comprise $Al_2O_3$ as a main component and a coating layer may comprise $Al_2O_3$ as a main component and $Fe_2O_3$ as an additional component.

The base may comprise $Al_2O_3$ as a main component, the coating layer may comprise $Al_2O_3$ as a main component and $Fe_2O_3$ and CaO as an additional component.

The base may comprise $Al_2O_3$ as a main component and the coating layer may comprise $Al_2O_3$ as a main component and $TiO_2$ as an additional component.

The base may comprise $Al_2O_3$ as a main component and the coating layer may comprise unstabilized $ZrO_2$ and/or partially stabilized $ZrO_2$ as a main component, and BaO and/or SrO, and $TiO_2$ as an additional component.

The base may comprise $Al_2O_3$ as a main component, the coating layer may comprise unstabilized $ZrO_2$ and/or partially stabilized $ZrO_2$ as a main component, and BaO and/or SrO, $TiO_2$ and CaO (different from CaO used in stabilizing $ZrO_2$) as an additional component.

The base may comprise $Al_2O_3$ as a main component, the coating layer may comprise unstabilized $ZrO_2$ and/or partially stabilized $ZrO_2$ as a main component, and $Fe_2O_3$ and CaO (different from CaO used in stabilizing $ZrO_2$) as an additional component.

The coating layer may comprise at least one main component selected from the group consisting of $ZrO_2$ stabilized with MgO, $ZrO_2$ stabilized with CaO, and $ZrO_2$ stabilized with $Y_2O_3$.

The coating layer may comprise an unstabilized $ZrO_2$ and at least one selected from the group consisting of $ZrO_2$ stabilized with MgO, $ZrO_2$ stabilized with CaO, $ZrO_2$ stabilized with $Y_2O_3$ as a main component.

$ZrO_2$ used as a main component of the coating layer may be unstabilized $ZrO_2$.

The coating layer may comprise particles having 0.1 mm in diameter or less in an amount of 50 wt % or more.

According to another aspect of the present invention, there is provided a setting member for a heating material in which a coating layer having excellent hardness is tightly bonded to the entire or partial surface of a base. Owing to the excellent hardness of the coating layer, the setting member is hardly abraded and peeled when exposed to high temperatures.

The setting member for a heating material of the present invention can be manufactured by the steps of: molding raw material comprising at least one main component selected from the group consisting of $Al_2O_3$, MgO and $ZrO_2$, and heating the molded raw material to form a base, coating the surface of the base partially or in its entirety with a coating material comprising a main component, $ZrO_2$ in an amount of 80 wt % or more, and at least one additional component selected from the group consisting of $Fe_2O_3$, $TiO_2$, BaO, SrO, CaO, and MgO (different from CaO and MgO used as a stabilizer for $ZrO_2$) in an amount of 0.5 to 10.0 wt %, in which the coating material comprises particles of 0.1 mm or less in diameter in an amount of 50 wt % or more; and drying the base coated with the coating material and heating or sintering (hereinafter, referred to as "heating") at 1300° to 1550° C.

The setting member of the present invention may be manufactured by employing the base comprising $Al_2O_3$ as a main component, and the coating material comprising unstabilized $ZrO_2$ and/or $ZrO_2$ partially stabilized with CaO as a main component and $TiO_2$, BaO, SrO and CaO (different from CaO used in stabilizing $ZrO_2$) as an additional component.

The setting member may be manufactured by employing the base comprising $Al_2O_3$ as a main component, and the coating material comprising unstabilized $ZrO_2$ and/or $ZrO_2$ partially stabilized with CaO as a main component and $Fe_2O_3$ and CaO (different from CaO in stabilizing $ZrO_2$) as an additional component.

The setting member may be manufactured even if $ZrO_2$ serving as a main component of the base is partially stabilized $ZrO_2$.

The setting member may be manufactured even if $ZrO_2$ serving as a main component of the base is partially stabilized $ZrO_2$ and unstabilized $ZrO_2$.

According to the present invention, as the coating layer becomes harder, the bonding between the base and coating layer becomes stronger. Owing to this feature, the abrasion and peeling of the coating layer is reduced more than those of the conventional setting material, even if a heating material such as a ceramic condenser or ferrite is repeatedly heated while heating and cooling are being repeated.

Furthermore, the heating material cannot be degraded since the coating material does not react with a heating material.

Moreover, a long-life setting member can be obtained, contributing to cost saving.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram showing a state of $Al_2O_3$—$TiO_2$ series; and

FIG. 2 is a view of an apparatus for use in an abrasion resistance test of the ceramic material used in the setting member for a heating material, obtained in the method of the present invention.

DETAILED DESCRIPTION OF THE PREFERRED EMBODIMENTS

The setting member for a heating material of the present invention is formed by coating a coating layer on a base partially or in its entirety and heating the base coated with a coating layer, in which the base comprises at least one main component selected from the group consisting of $Al_2O_3$, MgO and $ZrO_2$ and the coating layer comprises (at least one main component selected from the group consisting of $Al_2O_3$, MgO and $ZrO_2$) at least one additional component selected from $Fe_2O_3$, $TiO_2$, BaO, SrO, CaO, and MgO.

The base used herein must contain at least one component selected from the group consisting of $Al_2O_3$, MgO and $ZrO_2$, in an amount of 70 wt % or more. If the component is contained in an amount less than 70 wt %, it is not preferable since the content of $SiO_2$ is relatively increased.

The base including $Al_2O_3$ as a main component is formed by molding $Al_2O_3$ powder, sintering the molded $Al_2O_3$ powder at 1600° C. or more. Alternatively, the base may be formed by adding an alumina silicate such as mullite, andalsite, sillimanite or kaolin to the $Al_2O_3$ powder and sintering the mixture at a temperature from 1300° to 1750° C.

It is preferred that $ZrO_2$ may be at least one selected from the group consisting of $ZrO_2$ partially stabilized with CaO, $ZrO_2$ partially stabilized with MgO, and $ZrO_2$ partially stabilized with $Y_2O_3$. However, depending on types or usages of a heating material, $ZrO_2$ may be a mixture of an unstabilized $ZrO_2$ and at least one of partially stabilized $ZrO_2$ selected from the group consisting of the aforementioned three types of $ZrO_2$. When the $ZrO_2$ mixture is used, the partially stabilized $ZrO_2$ is preferably contained in an amount of 50 wt % or more. The base cannot be formed of unstabilized $ZrO_2$ alone.

The base can be formed of MgO alone. The base may be formed by sintering a mixture of MgO and spinelle or a mixture of MgO, spinelle and $ZrO_2$, at a temperature from 1550° to 1700° C. The base made of the aforementioned materials has a strong heat resistance during heat treatment and less harmful influence on a heating material.

The coating layer may be formed on the entire surface of the base thus obtained or partially on the surface contact with a heating material.

The coating layer used herein may comprise at least one main component selected from the group consisting of $Al_2O_3$, MgO and $ZrO_2$. The main component of the coating layer may be the same as or different from that of the base.

$ZrO_2$ used as the main component of the coating layer may be at least one selected from the group consisting of $ZrO_2$ partially stabilized with CaO, $ZrO_2$ partially stabilized with MgO, and $ZrO_2$ partially stabilized with $Y_2O_3$, a mixture of unstabilized $ZrO_2$ and at least one partially stabilized $ZrO_2$ selected from the group consisting of aforementioned three types of partially stabilized $ZrO_2$, or unstabilized $ZrO_2$ alone.

The main component of the coating layer used herein must include at least one component selected from the group consisting of $Al_2O_3$, MgO and $ZrO_2$ in an amount of 80 wt % or more. If the main component is contained in an amount less than 80 wt %, it is not preferable since $SiO_2$ liable to react with a heating material is relatively increased in the amount.

The coating layer may include the aforementioned main component and at least one additional component selected from $Fe_2O_3$, $TiO_2$, BaO, SrO, CaO, and MgO which are unrelated with CaO and MgO used as a stabilizer for $ZrO_2$. It should be noted that the additional component can not be the same as the main component of the coating layer. To be more specific, when MgO is employed as the main component of the coating layer and as an additional component, it produces no effect. When MgO is employed, at least one additional component must be selected from $Fe_2O_3$, $TiO_2$, BaO, SrO, and CaO except MgO.

The additional component may be contained in the coating material in an amount of 0.5 to 10.0 wt %. If the content of the additional component is less than 0.5 wt %, the coating layer may fail to tightly bond to a base. The coating layer thus obtained is liable to be peeled off and low in hardness and abrasion resistance. As a result, the setting member will not be obtained in good quality. In contrast, if the content of the additional component exceeds 10 wt %, the resultant coating layer will be extremely dense. As a result peeling also occurs when the coating layer is heated together with a heating material. Furthermore, reaction with a heating material is easily taken place. The additional component may be contained at an amount within the aforementioned range in accordance with types of the base and heating material. For example, $Fe_2O_3$, BaO and $TiO_2$, even in a relatively small content, can produce effects. MgO or SrO may be added in a relatively large amount.

Of the particles of the components forming the coating layer, the particles having 0.1 mm or less in diameter are preferably contained in an 50 wt % or more. If the amount of particles having 0.1 mm or less in diameter is less than 50 wt %, it is not preferable since sufficient hardness of the coating layer cannot be obtained. To offset the decrease in hardness, it may be effective to increase the content of the additional component. However, if so, the content of the additional amount exceeds the upper limit (10 wt %) limited by the present invention from the viewpoint of preventing the reaction with a heating material.

Hereinbelow, we will give examples of preferable combinations of the main components of the base and the coating layer and the additional component of the coating layer, which should be chosen in accordance with a type of a heating material or the like.

When $Al_2O_3$ is used as the main component of the base, the following combinations may be employed as the coating layer:

1. Main component: $Al_2O_3$
   Additional component: $Fe_2O_3$ (1 to 6 wt %)
2. Main component: $Al_2O_3$
   Additional component: $Fe_2O_3$ and CaO (1.5 to 7.5 wt % in total)
3. Main component: $Al_2O_3$
   Additional component: $TiO_2$ (0.5 to 5.5 wt %)
4. Main component: unstabilized $ZrO_2$ and/or Partially stabilized $ZrO_2$ with CaO
   Additional component: Either BaO and/or SrO and $TiO_2$ (3 to 5 wt % in total)
5. Main component: unstabilized $ZrO_2$ and/or Partially stabilized $ZrO_2$ with CaO
   Additional component: Either BaO and/or SrO and $TiO_2$ (3 to 5 wt %) and CaO* (1 to 3 wt %)
6. Main component: unstabilized $ZrO_2$ and/or Partially stabilized $ZrO_2$ with CaO
   Additional component: $Fe_2O_3$ and CaO* (1 to 7.5 wt % in total)
   * CaO is different from CaO used as a stabilizer for $ZrO_2$ When $TiO_2$ is added together with BaO and SrO, they may be added simultaneously in the form of a compound such as $BaTiO_3$ and $SrTiO_3$. In a similar way, they are added in the form of a compound such as $BaCO_3$ and $SrCO_3$, $CaCO_3$ since they can convert into BaO, SrO and CaO shown in claim 1 after heating.

The additional component, even if added in a small amount, produces highly advantageous effects such as improvements in strength of the coating layer itself, in binding strength between the coating layer and the base and in abrasion resistance of the coating layer. Therefore, when the setting member of the present invention is repeatedly subjected to heating and cooling, abrasion, particle removal, and peeling of the coating layer are scarcely observed, increasing its lifetime. The causes of such advantageous effects are not exactly elucidated but presumably considered as follows:

If a coating layer comprises at least one main component selected from the group consisting of $Al_2O_3$, MgO, and $ZrO_2$ as the main component in the coating layer and an additional component selected from the group consisting of $Fe_2O_3$, $TiO_2$, BaO, SrO and the like, the solid solution reaction will take place between $Al_2O_3$ and MgO or $ZrO_2$ in the coating layer or between the coating material and the base, at a heating temperature of near 1500° C. As a result, a compound or a liquid phase is rapidly produced.

When $Al_2O_3$ is reacted with $TiO_2$, $Al_2TiO_5$ is produced at high temperature as shown in FIG. 1 but it will be decomposed into $TiO_2$ and $\alpha Al_2O_3$ at low temperature. However, in the case where coating layer of about 1 mm in thickness is present on the surface of the base, as is in the present invention, the coating layer is cooled relatively faster than the inside portion of the base, so that a compound stable at only high temperature is considered to be present at normal temperature in the coating layer. As explained above, the presence of the compound in the base contributes to improvements of binding strength and abrasion resistance of the coating layer.

In the combination of $Fe_2O_3$ and $TiO_2$ as an additional component and $Al_2O_3$, MgO and $ZrO_2$ as main components of the base material and coating material, the solid phase is partially formed on the surface of a particle of the main component and it probably acts as an auxiliary agent for bonding through heating. It has been conventionally known that a compound liable to produce a compound having a low melting point, such as $SiO_2$, $Na_2O$, $K_2O$, or $B_2O_3$ acts as an auxiliary agent. However such a compound is susceptible to react with a heating material and degrades the quality of the coating layer during heat treatment. The coating layer used in the present invention hardly reacts with a heating material and therefore the strength of the coating layer is scarcely lowered by heat treatment.

The invention of claim 14 of the present invention is directed to a method for producing a setting member for a heating material. In this invention, a base is formed by molding a raw material comprising at least one main component selected from the group consisting of $Al_2O_3$ and MgO or $ZrO_2$ into a predetermined form and by sintering the molded material. The raw material and sintering temperature are the same as previously described.

Then, a coating material is coated on the surface of the base partially or in its entirety. The coating layer is formed of a main component containing $ZrO_2$ in an amount of 80 wt % or more and at least one additional component selected from the group consisting of $Fe_2O_3$, $TiO_2$, BaO, SrO, CaO and MgO, (different from CaO, MgO used as a stabilizer for $ZrO_2$) in an amount of 0.5 to 10.0 wt %. The coating layer may be contained particles having 0.1 mm or less in an amount of 50 wt % or more.

$ZrO_2$ serving as a main component of the coating layer may be at least one selected from the group consisting of $ZrO_2$ partially stabilized with CaO, $ZrO_2$ partially stabilized with MgO, and $ZrO_2$ partially stabilized with $Y_2O_3$, may be unstabilized $ZrO_2$ or may be a mixture of unstabilized $ZrO_2$ and at least one selected from the group consisting of the aforementioned three types of partially stabilized $ZrO_2$.

As the additional component, a component inevitably contained in the raw material is not effective. Therefore, even if the same component is contained in the raw material, the additional component must be added independently. The additional component and the main component of the coating material must be mixed to disperse uniformly to each other and preferably mixed in a ball mill. The raw material of the coating material is preferably formed of particles having 0.1 mm or less in an amount of 50 wt % or more so as to impart sufficient hardness to the coating layer.

The base may be coated by the coating material by pouring or spraying a slurry of the coating material on the base. Thereafter, the coating material is bonded to the base by heating. Alternatively, the coating material may be flame sprayed into the base. The coating material may be formed in a thickness of 0.2 to 1 mm, in the same manner for use in forming a conventional setting member for a heating material. The coating material is heated at a low temperature in the range from 1300° to 1550° C., preferably from 1350° to 1450° C. Through the heating, the base can be tightly bonded to the coating layer, so that the coating layer is scarcely abraded and peeled off even if heating and cooling is repeated.

Hereinbelow, the setting member of the present invention will be explained with reference to examples.

(EXAMPLES 1–6 AND COMPARATIVE EXAMPLES 1–4)

In the Examples 1–6, the plate-like base of a setting member for a heating material was formed from $Al_2O_3$ powder having a purity of 99.9% in an amount of 70 to 80 wt % $SiO_2$ and a component inevitably contained in the powder. The raw material powder was molded and sintered at 1450° C. to obtain the base of a setting member whose external size of 150 mm×150 mm×8 mm, as shown in Table 1.

On the other hand, a coating material was prepared by adding additional components (shown in Table 1) to main component, $ZrO_2$ partially stabilized with CaO. Of the particles consisting of the coating material, particles having a diameter of 0.1 mm or less were set to be contained in an amount of 60 to 80 wt %.

The main component and additional component of the coating material were mixed uniformly in a ball mill. To the mixture thus formed, water was added in an amount of 25 to 40 wt % to make a slurry. Subsequently, the slurry was poured over the surface of the base to thereby form a coating layer of 1 mm in thick thereon. Thereafter, the base thus coated was dried at 100° C. and in an electric furnace to 1400° to 1500° C., thereby obtaining a setting member for a heating material.

In Examples 1 to 6, the main component, $Al_2O_3$ was contained in an amount of 70 to 80 wt % in the base. The main component, $ZrO_2$ and an additional component shown in table 1 were used in the coating material in an amount of 85 to 93 wt % and 0.6 to 6.0 wt %, respectively. It should be noted that CaO used as an additional component in Example 5 differs from CaO used for stabilizing $ZrO_2$ serving as the main component of the coating material.

On the setting member thus obtained, a plurality of ferrite or condensers were placed at random and repeatedly heated. Ferrite was heated at 1250° C. Ceramic condensers, Vristers and Pct thermistors were heated at 1350° C. in Examples or comparative examples. The heating was repeated until the coating layer was peeled from the base and a crack was generated in the setting member. The heating times repeated in both cases were checked. The heating was terminated upon the removal of the coating layer or upon the generation of a crack in the base. The results of Examples 1–6 are listed in Table 1, together with Comparative Examples 1–4. In the column "Relevancy to a heating material", types and states of heating materials are indicated.

In Tables 1 to 7, Examples having data of specific abrasion amount after heating (10 times) with comments "particles of coating material are bonded or "no desired properties" means that the heating was terminated after heating was repeated 10 times. Furthermore, Examples having no data of specific abrasion amount after heating (10 times) and no record in "Heating cycles" means that heating was terminated after the setting member was heating just once.

Using a plate-like test pieces formed of the same material as used in the setting member of a heating material shown in Table 1, the abrasion resistance of the coating layer was tested, immediately after the coating layer was bonded to the base by heating and after 10 time heating-cooling cycle was applied to the coating layer at the same temperature.

The abrasion resistance was tested by use of an apparatus shown in FIG. 2. The apparatus is constructed as follows: On a holding plate 1, a rotatable table 2 is mounted. To the rotatable table 2, a rotating axis 3 is connected, thereby rotating the rotatable table 2. Test piece holding plates 4 are immobilized on the rotatable table 2 by immobilizing vises 5, While a test piece 9 was placed on the rotatable table 2 and pressed on the surface by a pin 6, the rotatable table was rotated. In this manner the abrasion amount of the test piece was measured. In FIG. 2, reference numerals 7 and 8 are a pin holding member and a load cell, respectively. Other conditions for the abrasion test are as follows:

Size of a test piece*: 100φ×15 mm

Pin: 20φ ($TiB_2$)

Pressing Load: 2 kgf (0.6 kgf/cm²)

Abrasion rate: 21 cm/sec (100 r.p.m)

Abrasion distance: 2500 cm

Abrasion amount: the amount of reduced weight after test

* the surface of a test piece is made of $ZrO_2$ partially stabilized with CaO

As shown in Table 1, the coating layer of the setting members of the present invention shows extremely good abrasion resistance immediately after the coating layer was bonded by heating, compared to the coating layer containing no additional component. As a result, it was demonstrated that a good coating layer is formed on the base in the present invention, since a large number of the heating times were completed until the coating layer was peeled off and until a crack was made in the setting member. Any additional component such as $Fe_2O_3$, $TiO_2$, BaO, SrO, CaO, or MgO was used, the same results were obtained. Even if the additional component was added in an amount of 0.6%, the good coating layer was successfully obtained.

In Comparative Examples 1 and 2, since the coating materials thereof contained no addition components, the abrasion amounts were large in the abrasion test and coating particles were bonded onto the surface of a condenser as a heating material. The obtained coating layers were not satisfactory. In Comparative Examples 3 and 4, $Al_2O_3$ serving as a main component was contained in the base in an amount of 60 wt %. The setting members obtained were also not satisfactory since warp was developed on the setting member. The setting members were only used 18 times in heating-cooling cycles.

The setting members of all Examples and Comparative Examples on and after Example 7 were manufactured by using components shown in the corresponding Tables, and the same manufacturing method as in Examples 1–6 except that the sintering and heating temperatures of the base and coating material were appropriately chosen in accordance with the purity of the main component of the base and the properties of the main component and additional component used in the coating material.

TABLE 1

| No. | Base Component (wt. %) | | Main Component (wt. %) | | Rate of Particles of 0.1 mm or less (wt. %) | Additional Component (wt. %) | |
|---|---|---|---|---|---|---|---|
| Coating Material Component | | | | | | | |
| Example | | | | | | | |
| 1 | $Al_2O_3$ | 70 | $ZrO_2$—C*1 | 93 | 80 | $Fe_2O_3$ | 6.0 |
| 2 | $Al_2O_3$ | 70 | " | 90 | 70 | $TiO_2$ | 4.0 |
| 3 | $Al_2O_3$ | 70 | " | 85 | 60 | BaO | 0.6 |
| 4 | $Al_2O_3$ | 75 | " | 88 | 60 | SrO | 3.0 |
| 5 | $Al_2O_3$ | 75 | " | 91 | 70 | CaO | 2.0 |
| 6 | $Al_2O_3$ | 80 | " | 89 | 75 | MgO | 2.0 |
| Comparative Example | | | | | | | |
| 1 | $Al_2O_3$ | 70 | $ZrO_2$—C | 98 | 85 | None | |
| 2 | $Al_2O_3$ | 90 | MgO $Al_2O_3$ | 80 18 | 75 | None | |
| 3 | $Al_2O_3$ | 60 | $ZrO_2$—C | 90 | 80 | BaO | 5.0 |
| 4 | $Al_2O_3$ | 60 | $Al_2O_3$ $ZrO_2$—C | 80 4 | 75 | $Fe_2O_3$ | 3.0 |

| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
|---|---|---|---|---|---|
| Evaluation of Setting Member for Heating Material | | | | | |
| Evaluation at Heating Cycle | | | | | |
| Example | | | | | |
| 1 | 60 | 72 | 48 | No cracks until 48 cycles | Ferrite |
| 2 | 56 | 69 | 68 | No cracks until 68 cycles | Condenser |
| 3 | 96 | 125 | 63 | No cracks until 63 cycles | Condenser |
| 4 | 68 | 89 | 84 | No cracks until 84 cycles | Condenser |
| 5 | 94 | 116 | 72 | No cracks until 72 cycles | Ferrite |
| 6 | 162 | 206 | 78 | No cracks until 78 cycles | Condenser |
| Comparative Example | | | | | |
| 1 | 2220 | 2850 or more*2 | — | — | Condenser*3 |
| 2 | 1620 | 2400 | — | — | Condenser*3 |
| 3 | 21 | 30 | No peeling until 42 cycles | 42 | Condenser Large warp |
| 4 | 54 | 59 | No peeling until 18 cycles | No cracks until 18 cycles | Ferrite Large warp |

*1 $ZrO_2$—C . . . $ZrO_2$ partially stabilized with CaO
*2 . . . Abrasion proceeded to a base material
*3 . . . Particles of coating material adhere on the heating material (EXAMPLES 7–12 AND COMPARATIVE EXAMPLES 5–7)

The setting members were obtained by using materials shown in Table 2, in the same manner as in Examples 1–6. In Examples 7–12, $Al_2O_3$ was used as a main component, $ZrO_2$ partially stabilized with CaO was used as a main component of the coating material and two types of additional components were used.

As the additional components, $Fe_2O_3$ and CaO which was different from CaO used as a stabilizer for $ZrO_2$, were employed in an amount of 1.1 wt % in total (Example 7), $TiO_2$ and SrO, in an amount of 1.5 wt % in total (Example 8), $TiO_2$ and BaO, in an amount of 2.0 wt % in total (Example 9), $Fe_2O_3$ and MgO, in an amount of 2.5 wt % in total (Example 10), $TiO_2$ and CaO which was different from CaO used as a stabilizer for $ZrO_2$, in an amount of 3.0 wt % in total (Example 11), and $Fe_2O_3$ and $TiO_2$ in an amount of 0.5 wt % in total (Example 12).

The setting members thus obtained were satisfactory enough to be repeatedly employed in heating ferrite or a condenser for a number of times.

Hitherto, it is known that the setting member manufactured by using $Al_2O_3$ as the base and $ZrO_2$ as a main component of the coating material, is usually used for heating. In the coating material of such a setting member, if an additional component previously mentioned was added even in a small amount, an excellent setting member suitable for heating ferrite or a condenser was successfully obtained.

In Table 2, Comparative Examples 5 to 7 are shown. Of the particles constituting the coating material in these Comparative Examples, particles having a diameter of 0.1 mm or less were contained in an amount of 50 wt % or less. Comparative Example 7 employing MgO as a main component and an additional component. Comparative Examples 5 to 7 failed to provide a good setting member since particles of the coating material bonded to a condenser, as shown in Table 2.

TABLE 2

| | Coating Material Component | | | | | |
|---|---|---|---|---|---|---|
| No. | Base Component (wt. %) | | Main Component (wt. %) | Rate of Particles of 0.1 mm or less (wt. %) | Additional Component (wt. %) | |
| Example | | | | | | |
| 7 | $Al_2O_3$ | 80 | $ZrO_2$—C  90 | 80 | $Fe_2O_3$ CaO | 0.2 0.9 |
| 8 | $Al_2O_3$ | 80 | "  92 | 85 | $TiO_2$ SrO | 1.0 0.5 |
| 9 | $Al_2O_3$ | 85 | "  91 | 90 | $TiO_2$ BaO | 1.0 1.0 |
| 10 | $Al_2O_3$ | 85 | "  87 | 75 | $Fe_2O_3$ MgO | 0.5 2.0 |
| 11 | $Al_2O_3$ | 90 | "  85 | 85 | $TiO_2$ CaO | 1.0 2.0 |
| 12 | $Al_2O_3$ | 90 | "  86 | 75 | $Fe_2O_3$ $TiO_2$ | 0.2 0.3 |
| Comparative Example | | | | | | |
| 5 | $Al_2O_3$ | 80 | MgO  80 | 20 | $TiO_2$ | 2.0 |
| 6 | $Al_2O_3$ | 70 | $Al_2O_3$  98 | 30 | $Fe_2O_3$ CaO | 1.0 1.0 |
| 7 | $Al_2O_3$ | 90 | MgO  80 $Al_2O_3$  18 | 75 | MgO | 2.0 |

| | Evaluation of Setting Member for Heating Material | | | | |
|---|---|---|---|---|---|
| | | | Evaluation at Heating Cycle | | |
| No. | Specific Abrasion Amount after heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
| Example | | | | | |
| 7 | 98 | 124 | 82 | No cracks until 82 cycles | Ferrite |
| 8 | 36 | 52 | 132 | No cracks until 132 cycles | Condenser |
| 9 | 21 | 24 | 149 | No cracks until 149 cycles | Condenser |
| 10 | 87 | 103 | 105 | No cracks until 105 cycles | Ferrite |
| 11 | 42 | 57 | 120 | No cracks until 120 cycles | Condenser |
| 12 | 146 | 173 | 64 | No cracks until 64 cycles | Ferrite |
| Comparative Example | | | | | |
| 5 | 890 | 1280 | No peeling until 10 cycles | No cracks until 10 cycles | Condenser*3 |
| 6 | 260 | 520 | No peeling until 10 cycles | No cracks until 10 cycles | Ferrite*4 |
| 7 | 1580 | 2150 | — | — | Ferrite*3 |

*3 . . . Particles of coating material adhere on the heating material
*4 . . . Particles of coating material adhere on the heating material after 8 cycles (EXAMPLES 13–19, COMPARATIVE EXAMPLES 8–11)

The setting members were obtained by using materials shown in Table 3, in the same manner as in Examples 1–6. In Example 13, the same base material as that in Example 1 was used, $Al_2O_3$ was used as a main component and $Fe_2O_3$ as an additional component of the coating material. The setting member of Example 13 containing an additional component even in a small amount, heated ferrite 96 times. In Example 14 employing $Al_2O_3$ as a main component and a mixture of $TiO_2$ and BaO as an additional component of the coating material, a condenser experienced heating 160 times. In Example 15 and 16, varister and ferrite were tolerable to heating 46 times and 48 times, respectively. The setting material obtained by using MgO as a main component of the coating material, is suitable for heating a material containing PbO and $Bi_2O_3$ since it hardly react with other materials.

Example 17 and 18 employed $Al_2O_3$ and $ZrO_2$ stabilized with CaO as a main component of the coating material. Example 19 employed $Al_2O_3$ and MgO as a main component of the coating material. In any one of cases, a good result was obtained in ferrite heating. In Comparative Examples listed in Table 3, the main component of the coating material was used in an amount of 80 wt % or less. In these cases, after heating, no desired properties as ferrite, condenser and varister were obtained and therefore, the setting member obtained in Comparative Examples were not put into a practical use.

TABLE 3

| | | Coating Material Component | | | | | |
|---|---|---|---|---|---|---|---|
| No. | Base Component (wt. %) | Main Component (wt. %) | | Rate of Particles of 0.1 mm or less (wt. %) | Additional Component (wt. %) | | |
| Example | | | | | | | |
| 13 | $Al_2O_3$ 72 | $Al_2O_3$ | 95 | 60 | $Fe_2O_3$ | 3.0 | |
| 14 | $Al_2O_3$ 72 | $Al_2O_3$ | 94 | 60 | $TiO_2$ | 3.0 | |
| | | | | | BaO | 2.0 | |
| 15 | $Al_2O_3$ 90 | MgO | 97 | 80 | $TiO_2$ | 2.0 | |
| 16 | $Al_2O_3$ 90 | MgO | 90 | 90 | $Fe_2O_3$ | 8.0 | |
| 17 | $Al_2O_3$ 90 | $ZrO_2$—C | 86 | 80 | $Fe_2O_3$ | 0.6 | |
| | | $Al_2O_3$ | 2 | | BaO | 0.6 | |
| 18 | $Al_2O_3$ 80 | $ZrO_2$—C | 20 | 65 | $Fe_2O_3$ | 0.8 | |
| | | $Al_2O_3$ | 78 | | SrO | 0.8 | |
| 19 | $Al_2O_3$ 80 | $Al_2O_3$ | 20 | 80 | $Fe_2O_3$ | 1.0 | |
| | | MgO | 76 | | | | |
| Comparative Example | | | | | | | |
| 8 | $Al_2O_3$ 90 | $ZrO_2$—C | 75 | 60 | $Fe_2O_3$ | 5.0 | |
| 9 | $Al_2O_3$ 85 | $ZrO_2$—C | 65 | 60 | $TiO_2$ | 5.0 | |
| 10 | $Al_2O_3$ 72 | $Al_2O_3$ | 75 | 60 | $Fe_2O_3$ | 3.0 | |
| 11 | $Al_2O_3$ 90 | MgO | 70 | 80 | $TiO_2$ | 2.0 | |

| | Evaluation of Setting Member for Heating Material | | | | |
|---|---|---|---|---|---|
| | | Evaluation at Heating Cycle | | | |
| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
| Example | | | | | |
| 13 | 82 | 104 | 96 | No cracks until 96 cycles | Ferrite |
| 14 | 10 | 18 | 160 | No cracks until 160 cycles | Condenser |
| 15 | 40 | 54 | 46 | No cracks until 46 cycles | Varister |
| 16 | 64 | 92 | 48 | No cracks until 48 cycles | Ferrite |
| 17 | 20 | 28 | 132 | No cracks until 132 cycles | Ferrite |
| 18 | 44 | 58 | 148 | No cracks until 148 cycles | Ferrite |
| 19 | 92 | 121 | 53 | No cracks until 53 cycles | Ferrite |

TABLE 3-continued

| Comparative Example | | | | | |
|---|---|---|---|---|---|
| 8 | 70 | — | — | — | Ferrite No desired properties |
| 9 | 41 | — | — | — | Condenser No desired properties |
| 10 | 50 | — | — | — | Ferrite No desired properties |
| 11 | 28 | — | — | — | Varister No desired properties |

(EXAMPLES 20–25, AND COMPARATIVE EXAMPLES 12–15)

The setting members were obtained by using materials shown in Table 4, in the same manner as in Examples 1–6. In Example 20, MgO was employed as a main component of the base and rest was CaO and an inevitably contained component. The main component of the coating material was unstabilized $ZrO_2$, and $Fe_2O_3$ was used as an additional component of the coating material. Ferrite was able to be heated 105 times by using the setting member obtained in the above.

Example 21, $ZrO_2$ partially stabilized with CaO was used as a main component of the coating material, $TiO_2$ was used as an additional component. In this case, a good heating result was obtained with respect to a condenser.

Example 22, MgO was used as main components of the base and the coating material, and BaO was used as an additional component.

In Example 23, the main component of the base was MgO, a main component of the coating material was a mixture of MgO and $ZrO_2$ partially stabilized MgO, and SrO was added as an additional component. Although heating record was as low as 28 times, the coating layer of Example 23 was superior to that containing no additional components.

Example 24 employed MgO as a main component of the base, $Al_2O_3$ as a main component of the coating material, and MgO as an additional component of the coating material.

Example 25 employed MgO as a main component of the base, $Al_2O_3$ as a main component of the coating material, and $Fe_2O_3$ as an additional component of the coating material. In any one of the cases, good heating record was obtained.

Comparative Examples are also listed in Table 4. Comparative Examples 12 and 13 employed an additional component in an amount smaller than the range limited by the present invention. On the contrary, the amount of an additional component employed in Comparative Examples 14 and 15 exceeded the range. In any one of the case, the coating layer was peeled off after heated a few times. Therefore the setting members obtained in these Comparative Examples are not suitable for putting into practical use.

TABLE 4

| | | | Coating Material Component | | | |
|---|---|---|---|---|---|---|
| No. | Base Component (wt. %) | | Main Component (wt. %) | | Rate of Particles of 0.1 mm or less (wt. %) | Additional Component (wt. %) |
| Example | | | | | | |
| 20 | MgO | 80 | $ZrO_2$—N*5 | 80 | 70 | $Fe_2O_3$ 6.0 |
| 21 | MgO | 85 | $ZrO_2$—C | 83 | 65 | $TiO_2$ 4.0 |
| 22 | MgO | 90 | MgO | 98 | 75 | BaO 1.0 |
| 23 | MgO | 95 | MgO $ZrO_2$—M*6 | 79 10 | 75 | SrO 10.0 |
| 24 | MgO | 70 | $Al_2O_3$ | 83 | 80 | MgO 5.0 |
| 25 | MgO | 75 | $Al_2O_3$ | 93 | 80 | $Fe_2O_3$ 4.0 |
| Comparative Example | | | | | | |
| 12 | $Al_2O_3$ | 80 | $ZrO_2$—C | 87 | 65 | SrO 0.2 |
| 13 | MgO | 85 | $Al_2O_3$ MgO | 90 2 | 70 | $TiO_2$ 0.3 |
| 14 | $Al_2O_3$ | 77 | $ZrO_2$—C | 80 | 70 | $Fe_2O_3$ 15.0 |
| 15 | $Al_2O_3$ | 80 | $ZrO_2$—N | 84 | 100 | CaO 15.0 |

TABLE 4-continued

Evaluation of Setting Member for Heating Material

| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
|---|---|---|---|---|---|
| Example | | | | | |
| 20 | 48 | 59 | 105 | No cracks until 105 cycles | Ferrite |
| 21 | 38 | 50 | 48 | No cracks until 48 cycles | Condenser |
| 22 | 78 | 110 | 41 | No cracks until 41 cycles | Condenser |
| 23 | 36 | 52 | 28 | No cracks until 28 cycles | Condenser |
| 24 | 96 | 140 | 60 | No cracks until 60 cycles | Ferrite |
| 25 | 61 | 70 | 102 | No cracks until 102 cycles | Ferrite |
| Comparative Example | | | | | |
| 12 | 890 | 1500 | — | — | Condenser*3 |
| 13 | 420 | 610 | No peeling until 10 cycles | No cracks until 10 cycles | Condenser*7 |
| 14 | 5 | — | — | — | Ferrite No desired properties |
| 15 | 132 | — | — | — | Ferrite No desired properties |

*5 $ZrO_2$—N . . . Unstabilized $ZrO_2$
*6 $ZrO_2$—M . . . $ZrO_2$ partially stabilized with MgO
*3 . . . Particles of coating material adhere on the heating material
*7 . . . Particles of coating material adhere on the heating material after 5 cycles (EXAMPLES 26–29)

The setting members were obtained by using materials shown in Table 5, in the same manner as in Examples 1–6. Examples 26–29 employed two types of compounds as a main component of the base.

Example 26 employed a mixture of MgO and $Al_2O_3$ as a main component of the base. In Example 27, a mixture of $Al_2O_3$ and unstabilized $ZrO_2$ was used as main component of the base. In Example 28, a main component of the base was a mixture of $ZrO_2$ partially stabilized with CaO and MgO, and a main component of the coating material was $ZrO_2$ partially stabilized with CaO.

In Example 29, a main component of the base was a mixture of MgO and $Al_2O_3$ and $ZrO_2$ partially stabilized with $Y_2O_3$, and the main component of the coating layer was $ZrO_2$ partially stabilized with $Y_2O_3$. Any of the setting members obtained in these Examples is excellent as shown in Table 5.

TABLE 5

| | | | Coating Material Component | | |
|---|---|---|---|---|---|
| No. | Base Component (wt. %) | | Main Component (wt. %) | Rate of Particles of 0.1 mm or less (wt. %) | Additional Component (wt. %) |
| Example | | | | | |
| 26 | MgO<br>$Al_2O_3$ | 60<br>20 | MgO | 80 | 90 | $Fe_2O_3$ 2.0 |
| 27 | $Al_2O_3$<br>$ZrO_2$—N | 50<br>30 | $Al_2O_3$ | 80 | 90 | BaO 2.0 |
| 28 | $ZrO_2$—C<br>MgO | 50<br>30 | $ZrO_2$—C | 80 | 90 | SrO 3.0 |
| 29 | MgO<br>$Al_2O_3$<br>$ZrO_2$—Y | 70<br>15<br>10 | $ZrO_2$—Y*8 | 95 | 80 | $TiO_2$ 2.0 |

TABLE 5-continued

| | Evaluation of Setting Member for Heating Material | | | | |
|---|---|---|---|---|---|
| | | Evaluation at Heating Cycle | | | |
| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
| Example | | | | | |
| 26 | 76 | 114 | 51 | No cracks until 51 cycles | Ferrite |
| 27 | 38 | 49 | 89 | No cracks until 89 cycles | Condenser |
| 28 | 72 | 99 | 85 | No cracks until 85 cycles | Condenser |
| 29 | 30 | 38 | 125 | No cracks until 125 cycles | Condenser |

*8 $ZrO_2$—Y . . . $ZrO_2$ partially stabilized with $Y_2O_3$ (EXAMPLES 30–35)

The setting members were obtained by using materials shown in Table 6, in the same manner as in Examples 1–6. The setting members of Examples 30–35 employed $ZrO_2$, at least part of which was partially stabilized with a stabilizer, as a main component of the base.

In Example 30, $ZrO_2$ partially stabilized with CaO was used as a main component of the base and $Al_2O_3$ was a main component of the coating material to which $Fe_2O_3$ was added as an additional component.

Example 31 employed $ZrO_2$ partially stabilized with $Y_2O_3$ as a main component of the base and unstabilized $ZrO_2$ as a main component of the coating material.

In Example 32, $ZrO_2$ partially stabilized with MgO was used as a main component of the base and unstabilized $ZrO_2$ as a main component of the coating material. Further, as an additional component, use was made of MgO, which was different from MgO used as a stabilizer for $ZrO_2$.

In all setting members obtained above, abrasion resistance and peel resistance were satisfactory.

In Example 33, a mixture of $ZrO_2$ partially stabilized with CaO and $ZrO_2$ partially stabilized with $Y_2O_3$ was used as a main component of the base and the main component of the coating material was MgO and additional component was SrO.

Example 34 employed a mixture of $ZrO_2$ partially stabilized with CaO and unstabilized $ZrO_2$ as a main component of the base.

In Example 35, the main component of the base was a mixture of $ZrO_2$ partially stabilized with $Y_2O_3$ and unstabilized $ZrO_2$.

The main components of the coating materials of Examples 33 and 34 were MgO and unstabilized $ZrO_2$, respectively. The setting members obtained in Examples 33 and 34 were excellent.

Comparative Examples 16 and 17 are similar to Examples 34 and 35 except that the Comparative Examples contain no additional components. In the setting members obtained in Comparative Examples 16 and 17, a large abrasion amount was obtained after heating and particles of the coating layer were bonded onto a condenser, so that they was not practically used. As is apparent from the above, the effect of the additional component is remarkably excellent.

TABLE 6

| | | | Coating Material Component | | | | | |
|---|---|---|---|---|---|---|---|---|
| No. | Base Component (wt. %) | | Main Component (wt. %) | | Rate of Particles of 0.1 mm or less (wt. %) | Additional Component (wt. %) | | |
| Example | | | | | | | | |
| 30 | $ZrO_2$—C | 80 | $Al_2O_3$ | 85 | 80 | $Fe_2O_3$ | 3.0 | |
| 31 | $ZrO_2$—Y | 95 | $ZrO_2$—N | 97 | 60 | $TiO_2$ | 2.0 | |
| 32 | $ZrO_2$—M | 70 | $ZrO_2$—N MgO | 73 25 | 70 | BaO | 1.0 | |
| 33 | $ZrO_2$—C $ZrO_2$—Y | 70 25 | MgO | 80 | 70 | SrO | 4.0 | |
| 34 | $ZrO_2$—C $ZrO_2$—N | 40 40 | $ZrO_2$—N | 96 | 75 | CaO | 3.0 | |
| 35 | $ZrO_2$—Y $ZrO_2$—N | 65 30 | $ZrO_2$—N | 94 | 70 | MgO | 5.0 | |

TABLE 6-continued

| Comparative Example | | | | | | | |
|---|---|---|---|---|---|---|---|
| 16 | ZrO$_2$—C | 40 | ZrO$_2$—N | 96 | 75 | None | |
| | ZrO$_2$—N | 40 | | | | | |
| 17 | ZrO$_2$—Y | 65 | ZrO$_2$—N | 94 | 70 | None | |
| | ZrO$_2$—N | 30 | | | | | |

Evaluation of Setting Member for Heating Material

| | | Evaluation at Heating Cycle | | | |
|---|---|---|---|---|---|
| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
| Example | | | | | |
| 30 | 52 | 58 | 84 | No cracks until 84 cycles | Ferrite |
| 31 | 80 | 118 | 102 | No cracks until 102 cycles | PCT thermistor |
| 32 | 104 | 162 | 40 | No cracks until 40 cycles | Condenser |
| 33 | 96 | 150 | 36 | No cracks until 36 cycles | Condenser |
| 34 | 120 | 206 | 120 | No cracks until 120 cycles | Condenser |
| 35 | 180 | 315 | 80 | No cracks until 80 cycles | Condenser |
| Comparative Example | | | | | |
| 16 | 2500 or more*9 | — | — | — | Condenser*3 |
| 17 | 2600 or more*9 | — | — | — | Condenser*3 |

*3 . . . Particles of coating material adhere on the heating material
*9 . . . Abrasion proceeded to a base material (EXAMPLES 36–43)

The setting members were obtained by using materials shown in Table 7, in the same manner as in Examples 1–6. In Example 36, a main component of the base was Al$_2$O$_3$, a main component of the coating material was unstabilized ZrO$_2$ and an additional component was MgO. In this case, even if Mgo serving as an additional component was added in an amount as large as 6.0 wt %, heating times until the coating material was peeled off, were recorded as large as 120 times.

Example 37, CaO was added as an additional component in an amount of 7.0 wt %.

Examples 38–43, three types of additional components were used.

Any setting member obtained above is excellent in heating record, as is apparent from Table 7.

TABLE 7

| | | Coating Material Component | | |
|---|---|---|---|---|
| No. | Base Component (wt. %) | Main Component (wt. %) | Rate of Particles of 0.1 mm or less (wt. %) | Additional Component (wt. %) |
| Example | | | | |
| 36 | Al$_2$O$_3$ 93 | ZrO$_2$—N 85 | 65 | MgO 6.0 |
| 37 | Al$_2$O$_3$ 80 | ZrO$_2$—C 45 | 70 | CaO 7.0 |
| | | ZrO$_2$—Y 45 | | |
| 38 | Al$_2$O$_3$ 85 | ZrO$_2$—C 85 | 65 | BaO 4.0 |
| | | | | TiO$_2$ 3.0 |
| | | | | CaO 3.0 |
| 39 | Al$_2$O$_3$ 98 | ZrO$_2$—N 95 | 100 | BaO 0.5 |
| | | | | TiO$_2$ 2.0 |
| | | | | CaO 2.0 |
| 40 | Al$_2$O$_3$ 75 | ZrO$_2$—C 30 | 70 | BaO 3.0 |
| | | ZrO$_2$—N 60 | | TiO$_2$ 2.0 |

TABLE 7-continued

| | | | | | | | |
|---|---|---|---|---|---|---|---|
| 41 | Al₂O₃ | 75 | ZrO₂—C | 30 | 70 | CaO | 1.0 |
| | | | ZrO₂—N | 60 | | SrO | 3.0 |
| | | | | | | TiO₂ | 2.0 |
| 42 | Al₂O₃ | 85 | ZrO₂—C | 85 | 65 | CaO | 1.0 |
| | | | | | | SrO | 4.0 |
| | | | | | | TiO₂ | 3.0 |
| 43 | Al₂O₃ | 98 | ZrO₂—N | 95 | 100 | CaO | 3.0 |
| | | | | | | SrO | 0.5 |
| | | | | | | TiO₂ | 2.0 |
| | | | | | | CaO | 2.0 |

| | Evaluation of Setting Member for Heating Material | | | | |
|---|---|---|---|---|---|
| | | Evaluation at Heating Cycle | | | |
| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
| Example | | | | | |
| 36 | 120 | 160 | 120 | No cracks until 120 cycles | Condenser |
| 37 | 52 | 61 | 85 | No cracks until 85 cycles | Condenser |
| 38 | 5 | 16 | 134 | No cracks until 134 cycles | Condenser |
| 39 | 25 | 44 | 160 | No cracks until 160 cycles | Condenser |
| 40 | 5 | 18 | 152 | No cracks until 152 cycles | Condenser |
| 41 | 32 | 56 | 144 | No cracks until 144 cycles | Condenser |
| 42 | 28 | 46 | 105 | No cracks until 105 cycles | Varister |
| 43 | 32 | 48 | 148 | No cracks until 148 cycles | PCT thermistor |

(EXAMPLES 44–51)

The setting members were obtained by using materials shown in Table 8, in the same manner as in Examples 1–6. In each of Examples 44–49, a main component of the coating material was partially stabilized $ZrO_2$ or unstabilized $ZrO_2$. In these cases, two types of compounds were used as the additional component, the resultant coating layers were excellent in peel resistance. In Example 49, a varister was used as a heating material. The result of the heating was excellent. Examples 50–51, two types of components are used as the main component and as the additional component of the coating material. Example 52 employed three types of additional components. In any setting member mentioned above, excellent results were obtained.

TABLE 8

| | Coating Material Component | | | |
|---|---|---|---|---|
| No. | Base Component (wt. %) | Main Component (wt. %) | Rate of Particles of 0.1 mm or less (wt. %) | Additional Component (wt. %) |
| Example | | | | |
| 44 | Al₂O₃ 90 | ZrO₂—C 90 | 75 | BaO 5.0 |
| | | | | TiO₂ 3.0 |
| 45 | Al₂O₃ 98 | ZrO₂—Y 90 | 80 | BaO 2.0 |
| | | | | TiO₂ 3.0 |
| 46 | Al₂O₃ 99 | ZrO₂—N 96 | 80 | SrO 2.0 |
| | | | | TiO₂ 1.0 |
| 47 | Al₂O₃ 99 | ZrO₂—N 96 | 80 | BaO 2.0 |
| | | | | TiO₂ 1.0 |
| 48 | Al₂O₃ 90 | ZrO₂—C 90 | 75 | SrO 5.0 |
| | | | | TiO₂ 3.0 |
| 49 | Al₂O₃ 98 | ZrO₂—Y 90 | 80 | SrO 2.0 |
| | | | | TiO₂ 3.0 |
| 50 | Al₂O₃ 95 | ZrO₂—C 60 | 60 | SrO 7.0 |
| | | ZrO₂—N 28 | | TiO₂ 3.0 |

TABLE 8-continued

| 51 | Al$_2$O$_3$ | 95 | ZrO$_2$—C | 60 | 60 | BaO | 7.0 |
|----|-------------|----|-----------|----|----|-----|-----|
|    |             |    | ZrO$_2$—N | 28 |    | TiO$_2$ | 3.0 |
| 52 | Al$_2$O$_3$ | 99 | ZrO$_2$—N | 96 | 80 | BaO | 1.0 |
|    |             |    |           |    |    | SrO | 1.0 |
|    |             |    |           |    |    | TiO$_2$ | 3.0 |

Evaluation of Setting Member for Heating Material

| | | Evaluation at Heating Cycle | | |
|---|---|---|---|---|
| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |

| Example | | | | | |
|---|---|---|---|---|---|
| 44 | 10 | 15 | 126 | No cracks until 126 cycles | Condenser |
| 45 | 5 | 13 | 146 | No cracks until 146 cycles | Condenser |
| 46 | 45 | 54 | 128 | No cracks until 128 cycles | PCT thermistor |
| 47 | 10 | 22 | 136 | No cracks until 136 cycles | Condenser |
| 48 | 46 | 60 | 101 | No cracks until 101 cycles | Condenser |
| 49 | 35 | 44 | 132 | No cracks until 132 cycles | Varister |
| 50 | 52 | 65 | No peeling until 84 cycles | No cracks until 84 cycles | Condenser |
| 51 | 10 | 18 | No peeling until 92 cycles | No cracks until 92 cycles | Condenser |
| 52 | 15 | 26 | 140 | No cracks until 140 cycles | Condenser |

(Examples 53–58)

The setting members were obtained by using materials shown in Table 9, in the same manner as in Examples 1–6. In all Examples shown in Table 9, the main component of the base was Al$_2$O$_3$ and a main component of the coating material was partially stabilized ZrO$_2$ (Example 53), unstabilized ZrO$_2$ (Example 54), and a mixture of partially stabilized ZrO$_2$, and unstabilized ZrO$_2$ (Example 55). The two types of additional components were used in the coating material as shown in Table 9. Furthermore, Examples 56–58, Al$_2$O$_3$ was used as the main components of the base and of the coating material. The additional components are Fe$_2$O$_3$ (Example 56), Fe$_2$O$_3$ and CaO (Example 57), and TiO$_2$ (Example 58). In all cases mentioned above, excellent results were obtained in a heating test of a condenser or ferrite.

TABLE 9

| | | Coating Material Component | | |
|---|---|---|---|---|
| No. | Base Component (wt. %) | Main Component (wt. %) | Rate of particles of 0.1 mm or less (wt. %) | Additional Component (wt. %) |

| Example | | | | |
|---|---|---|---|---|
| 53 | Al$_2$O$_3$ 90 | ZrO$_2$—C 95 | 80 | Fe$_2$O$_3$ 1.0 |
|    |                |               |    | CaO 5.0 |
| 54 | Al$_2$O$_3$ 75 | ZrO$_2$—N 85 | 75 | Fe$_2$O$_3$ 1.0 |
|    |                |               |    | CaO 0.5 |
| 55 | Al$_2$O$_3$ 80 | ZrO$_2$—C 80 | 70 | Fe$_2$O$_3$ 3.0 |
|    |                | ZrO$_2$—N 15 |    | CaO 1.0 |
| 56 | Al$_2$O$_3$ 70 | Al$_2$O$_3$ 89 | 60 | Fe$_2$O$_3$ 10.0 |
| 57 | Al$_2$O$_3$ 75 | Al$_2$O$_3$ 96 | 55 | Fe$_2$O$_3$ 2.0 |
|    |                |                 |    | CaO 1.0 |
| 58 | Al$_2$O$_3$ 90 | Al$_2$O$_3$ 97 | 60 | TiO$_2$ 2.0 |

TABLE 9-continued

Evaluation of Setting Member for Heating Material

| | | Evaluation at Heating Cycle | | | |
|---|---|---|---|---|---|
| No. | Specific Abrasion Amount after Heating (mg/Kgf · cm) | Specific Abrasion Amount after heating (10 times) | Heating Cycles for Removing Entire Coating Layer | Heating Cycles for Generating Crack on Setting Member | Heating Material and Relevancy thereof |
| Example | | | | | |
| 53 | 24 | 38 | 82 | No cracks until 82 cycles | Ferrite |
| 54 | 10 | 18 | 154 | No cracks until 154 cycles | Ferrite |
| 55 | 5 | 10 | 163 | No cracks until 163 cycles | Ferrite |
| 56 | 46 | 49 | No peeling until 120 cycles | No cracks until 120 cycles | Ferrite Properties deteriorate at 120th cycle |
| 57 | 10 | 20 | 196 | No cracks until 196 cycles | Ferrite |
| 58 | 30 | 36 | 105 | No cracks until 105 cycles | Condenser |

What is claimed is:

1. A setting member for a heating material comprising a base and a coating layer formed on a surface of said base partially or in its entirety, wherein said base comprises at least one main component selected from the group consisting of $Al_2O_3$, MgO and $ZrO_2$ in an amount of 70 wt % or more and said coating layer comprises at least one main component selected from the group consisting of $Al_2O_3$, MgO and $ZrO_2$ in an amount of 80 wt % or more, and 0.5 to 10.0 wt % of at least one additional component selected from the group consisting of $Fe_2O_3$, $TiO_2$, BaO, SrO, CaO and MgO, wherein if CaO or MgO are used to stabilize $ZrO$, as a main component of the coating layer, then the CaO and MgO that can be additional components are used in addition to the CaO or MgO used to stabilize the $ZrO_2$.

2. The setting member for a heating material according to claim 1, wherein a main component of said base comprises at least one selected from the group consisting of $ZrO_2$ partially stabilized with CaO, $ZrO_2$ partially stabilized with MgO, and $ZrO_2$ partially stabilized with $Y_2O_3$.

3. The setting member for a heating material according to claim 1, wherein a main component of said base comprises unstabilized $ZrO_2$ and at least one selected from the group consisting of $ZrO_2$ partially stabilized with CaO, $ZrO_2$ partially stabilized with MgO, and $ZrO_2$ partially stabilized with $Y_2O_3$.

4. The setting member for a heating material according to claim 1, wherein said base comprises $Al_2O_3$ as a main component and a coating layer comprises $Al_2O_3$ as a main component and $Fe_2O_3$ as an additional component.

5. The setting member for a heating material according to claim 1, wherein said base comprises $Al_2O_3$ as a main component, said coating layer comprises $Al_2O_3$ as a main component and $Fe_2O_3$ and CaO as an additional component.

6. The setting member for a heating material according to claim 1, wherein said base comprises $Al_2O_3$ as a main component and said coating layer comprises $Al_2O_3$ as a main component and $TiO_2$ as an additional component.

7. The setting member for a heating material according to claim 1, wherein said base comprises $Al_2O_3$ as a main component, said coating layer comprises unstabilized $ZrO_2$ and/or partially stabilized $ZrO_2$ as a main component, and BaO and/or SrO, and $TiO_2$ as an additional component.

8. The setting member for a heating material according to claim 1, wherein said base comprises $Al_2O_3$ as a main component, said coating layer comprises unstabilized $ZrO_2$ and/or partially stabilized $ZrO_2$ as a main component, and BaO and/or SrO, $TiO_2$ and CaO as an additional component.

9. The setting member for a heating material according to claim 1, wherein said base comprises $Al_2O_3$ as a main component, said coating layer comprises unstabilized $ZrO_2$ and/or partially stabilized $ZrO_2$ as a main component, and $Fe_2O_3$ and CaO as an additional component.

10. The setting member for a heating material according to claim 1, wherein said coating layer comprises at least one main component selected from the group consisting of $ZrO_2$ stabilized with MgO, $ZrO_2$ stabilized with CaO, and $ZrO_2$ stabilized with $Y_2O_3$.

11. The setting member for a heating material according to claim 1, wherein said coating layer comprises an unstabilized $ZrO_2$ and at least one selected from the group consisting of $ZrO_2$ stabilized with MgO, $ZrO_2$ stabilized with CaO, and $ZrO_2$ stabilized with $Y_2O_3$ as a main component.

12. The setting member for a heating material according to claim 1, wherein $ZrO_2$ used as a main component of said coating layer is unstabilized $ZrO_2$.

13. The setting member for a heating material according to claim 1, wherein said coating layer comprises particles having 0.1 mm in diameter or less in an amount of 50 wt % or more.

* * * * *